H. C. BERBEYER.
FRUIT-PICKERS.
No. 194,323. Patented Aug. 21, 1877.
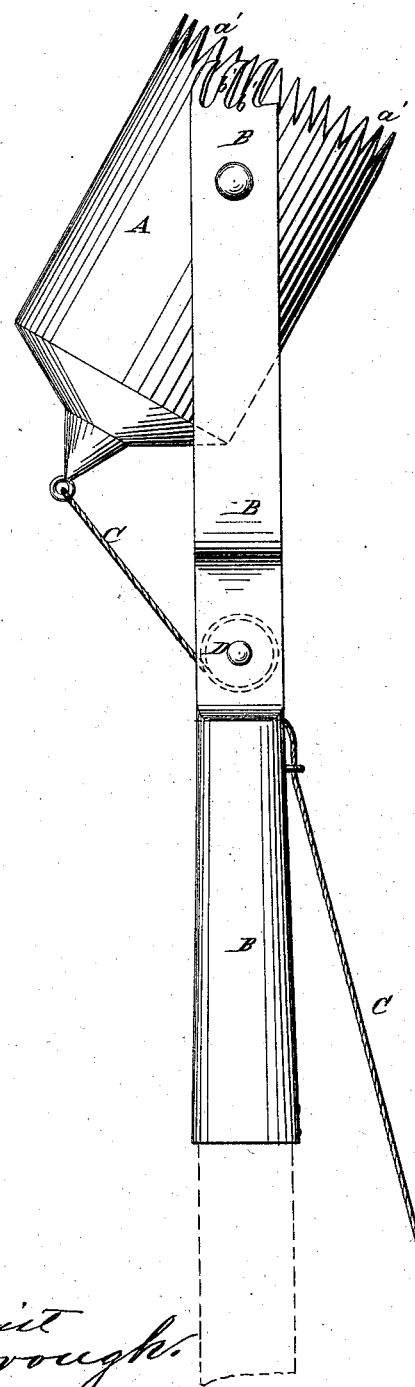
WITNESSES:
INVENTOR:
BY
ATTORNEYS.

UNITED STATES PATENT OFFICE.

H. CLÉMENT BERBEYER, OF PRICE, MISSOURI.

IMPROVEMENT IN FRUIT-PICKERS.

Specification forming part of Letters Patent No. 194,323, dated August 21, 1877; application filed July 23, 1877.

*To all whom it may concern:*

Be it known that I, H. CLÉMENT BERBEYER, of Price, in the county of St. Louis and State of Missouri, have invented a new and useful Improvement in Fruit-Pickers, of which the following is a specification:

The figure is a side view of my improved fruit-picker.

The object of this invention is to furnish an improved device for picking fruit from trees where they cannot be reached by hand, which will enable the fruit to be picked and lowered to the ground without being injured, and which shall be simple in construction and convenient in use.

The invention consists in an improved fruit-picker formed of the pivoted cup having teeth formed upon its edge, the forked socket-shank having teeth formed upon the ends of its forks, the cord, and the pulley, as hereinafter fully described.

A is a cup, which is made cylindrical or conical in form and with a concaved bottom. The cup A is pivoted at the upper parts of its opposite sides to the upper part of the forks of the forked shank B by bolts or rivets. Upon the upper ends of the forks of the shank B are formed curved or hook-shape teeth $b'$, and upon the upper edge of the cup A are formed teeth $a'$, which are made in the form of right angles, except at the sides next the forks of the shank B, where they should be made bent or hook shaped, the curve being in the opposite direction from that of the teeth $b'$.

To the center of the bottom of the cup A is attached the end of a cord, C, which passes around a small pulley, D, pivoted in the fork of the shank B, and extends thence down along the handle secured in the socket of the said shank B. The cup A is pivoted so far above its center of gravity that it will always hang in a vertical position.

In using the device it is passed up beneath the fruit to be picked in such a position that the said fruit may enter the said cup, and a slight twist will generally cause it to fall into the cup. In case the stem adheres firmly to the branch the picker is adjusted to bring the stem between the teeth $b'$ of the forks of the shank B, and a slight pull upon the cord C will cause it to be cut by and between the teeth $a'$ $b'$. When the cup A is filled it is lowered to the ground and the fruit is poured out into a basket or upon the ground by pulling upon the cord C.

Having thus described my invention, I claim as new and desire to secure by Letters Patent—

An improved fruit-picker, formed of the pivoted cup A, having teeth $a'$ formed upon its edge, the forked socket-shank B having teeth $b'$ formed upon the ends of its fork, the cord C, and the pulley D, substantially as herein shown and described.

H. CLÉMENT BERBEYER.

Witnesses:
CHAS. R. BLACK,
HENRY G. LITZSINGER.